(12) United States Patent
Griffioen et al.

(10) Patent No.: US 8,374,475 B2
(45) Date of Patent: Feb. 12, 2013

(54) OPTICAL WAVEGUIDE ASSEMBLY, STORAGE DEVICE, AND METHOD FOR INSTALLING AN OPTICAL WAVEGUIDE

(75) Inventors: Willem Griffioen, Ter Aar (NL); Gerard Plumettaz, Territet-Veytaux (CH); Tobias Roland Ahl, Mantorp (SE)

(73) Assignee: Draka Comteq B.V. (NL)

( * ) Notice: Subject to any disclaimer, the term of this patent is extended or adjusted under 35 U.S.C. 154(b) by 407 days.

(21) Appl. No.: 12/644,981

(22) Filed: Dec. 22, 2009

(65) Prior Publication Data

US 2010/0178020 A1    Jul. 15, 2010

(30) Foreign Application Priority Data

Dec. 23, 2008 (NL) ..................................... 2002366

(51) Int. Cl.
*G02B 6/52* (2006.01)
(52) U.S. Cl. ..................... 385/135; 385/134; 254/134.4
(58) Field of Classification Search .......................... None
See application file for complete search history.

(56) References Cited

U.S. PATENT DOCUMENTS

| | | | | |
|---|---|---|---|---|
| 4,429,428 A | * | 2/1984 | Van Dyk | 15/3.52 |
| 4,558,308 A | * | 12/1985 | Ciordinik et al. | 340/550 |
| 4,740,053 A | * | 4/1988 | Cassidy | 385/102 |
| 4,756,510 A | * | 7/1988 | Klamm et al. | 254/134.4 |
| 4,953,827 A | * | 9/1990 | Araki et al. | 254/134.4 |
| 4,990,033 A | * | 2/1991 | Handley et al. | 406/82 |
| 5,163,657 A | * | 11/1992 | Sano et al. | 254/134.4 |
| 5,199,689 A | * | 4/1993 | Proud et al. | 254/134.4 |
| 5,813,658 A | * | 9/1998 | Kaminski et al. | 254/134.4 |
| 6,152,951 A | * | 11/2000 | Hashimoto et al. | 607/92 |
| 6,220,413 B1 | | 4/2001 | Walters et al. | |
| 6,405,998 B1 | * | 6/2002 | Griffioen | 254/134.4 |
| 7,017,846 B2 | | 3/2006 | Tsoi et al. | |
| 2002/0172489 A1 | | 11/2002 | Daoud et al. | |
| 2005/0145522 A1 | | 7/2005 | Bloodworth et al. | |
| 2005/0184186 A1 | | 8/2005 | Tsoi et al. | |
| 2005/0236161 A1 | * | 10/2005 | Gay et al. | 166/380 |
| 2008/0011990 A1 | * | 1/2008 | Kostet et al. | 254/134 |
| 2008/0226251 A1 | * | 9/2008 | Neat et al. | 385/135 |

FOREIGN PATENT DOCUMENTS

| | | |
|---|---|---|
| EP | 0 135 132 A1 | 3/1985 |
| EP | 0 452 088 A1 | 10/1991 |
| FR | 2 748 576 A1 | 11/1997 |
| FR | 2 814 246 A | 3/2002 |
| GB | 2289805 A * | 11/1995 |
| GB | 2 424 128 A | 9/2006 |
| JP | 63-205621 A * | 8/1988 |
| WO | WO 98/12588 | 3/1998 |

OTHER PUBLICATIONS

International Search Report and Written Opinion for NL 2002366 dated Jul. 7, 2009.

* cited by examiner

*Primary Examiner* — Mike Stahl
(74) *Attorney, Agent, or Firm* — Leydig, Voit & Mayer, Ltd.

(57) ABSTRACT

An optical waveguide assembly is described that comprises a storage device having a housing (7) and a rotatable reel (2), configured for storing a flexible optical waveguide, wherein the reel (2) is coupled to a flexible optical waveguide unit (1) having an external diameter (D1) of at most 2 mm for winding and/or unwinding the waveguide unit (1).

20 Claims, 4 Drawing Sheets

OPTICAL WAVEGUIDE ASSEMBLY, STORAGE DEVICE, AND METHOD FOR INSTALLING AN OPTICAL WAVEGUIDE

CROSS-REFERENCE TO RELATED APPLICATION

This application claims priority to Griffioen, et al. NL Application 2002366, filed on Dec. 23, 2008, entitled "Optical Waveguide Assembly, Storage Device, and Method for Installing an Optical Waveguide," the contents of which are expressly incorporated by reference in their entirety, including any references contained therein.

FIELD OF THE INVENTION

The invention generally relates to an optical waveguide assembly comprising a storage device, wherein the storage device includes a housing and a rotatable reel for storing a flexible optical waveguide.

BACKGROUND

U.S. Pat. No. 6,220,413 B1 discloses a storage device having a reel that is rotatably mounted in a frame. The system disclosed by US'413 allows a fiber optic cable to be extended and retracted about a reel, for example to reuse the cable when offices are moved. Retraction of an optical fiber cable, onto a cable reel, is also known from U.S. Pat. No. 7,017,846.

SUMMARY OF THE INVENTION

The subject of the present application aims to provide an improved optical waveguide assembly. Particularly, the disclosure aims to provide a compact optical waveguide assembly, for storing a relatively long flexible optical waveguide. Also, the disclosed assembly is intended to improve optical wave guide installing procedures.

An embodiment of the invention provides an optical waveguide assembly that is characterized in that the reel is coupled to a flexible optical waveguide unit having an external diameter of at most 2 mm for winding and/or unwinding the waveguide unit.

A basic idea of the disclosed embodiment is that a bare optical fiber (having said relatively small external diameter) is wound onto and from a reel, instead of an optical cable (having a significantly larger diameter than the diameter of the optical fiber as such). In this way, a relatively small housing and respective reel can hold a relatively long waveguide unit. According to a further embodiment, a maximum dimension (length and width) of the housing is about 5 cm for holding an optical waveguide unit having a length of at least 10 m. Thus, the disclosed assembly provides a significant advantage over the relatively bulky prior art systems that are based on the winding of thick cables.

The disclosed exemplary embodiments of invention are particularly well suited for "in-house" applications. The present assembly provides installation of fiber optics in a building (for example a residence, or an office) wherein difficult fiber-operations like splicing and connectorization are preferably avoided. The present solution provides a plug-and-play solution that is installed in a do-it-yourself way. Also, the present solution allows a relatively straightforward replacement of an installed fiber optic waveguide with a future model.

In an exemplary embodiment a diameter of the reel is relatively small, for example about 5 cm or smaller. Also, an axial width of the reel is about 3 cm, or smaller. An embodiment of the reel of the assembly is configured to hold at most 1000 m of the optical waveguide unit, particularly at most 100 m. Besides, the assembly can include a plurality of optical waveguide units, each of the units being coupled to the reel to be wound and/or unwound.

According to an exemplary embodiment, the reel housing is associated with an external elongated protective enclosure (for example a tube or duct), the external enclosure being configured to receive at least part of the optical waveguide unit. For example, during installation, the external enclosure can easily be installed (like copper cables), e.g. stapled to the wall. The external enclosure protects the optical waveguide unit extending therein, for leading the waveguide unit from the reel housing to another location. Also, during installation, a length of the external enclosure is adjusted to a desired installation length. Superfluous waveguide length is wound onto the reel in case of shortening the external enclosure. Also, extra waveguide length is provided by the reel in case of lengthening the external enclosure.

Besides, the disclosure includes a storage device of the assembly, the reel of the storage device being configured to be coupled to the optical waveguide unit for winding and/or unwinding the waveguide unit. Preferably, the storage device is also configured to be coupled to an above-mentioned elongated external waveguide enclosure.

Also, a method for installing at least one optical waveguide is provided, for example utilizing an assembly according to the disclosed embodiments. The method includes:

providing an optical waveguide unit having an external diameter of at most 2 mm;

associating the optical waveguide unit with a reel; and arranging part of the optical waveguide unit in an elongated protective enclosure that is external to the reel.

This method can provide the above-mentioned advantages. Particularly, the elongated protective enclosure serves to guide the optical waveguide unit from a first location, being the reel, to a second location. In case the optical waveguide unit is longer than the elongated protective enclosure, the reel can locally store remaining waveguide unit length in a very compact manner.

Also, an advantageous aspect of the disclosed embodiments is the provision of a method for installing an optical waveguide unit, the method comprising: coupling a flexible optical waveguide unit to a reel, and rotating the reel using a fluid drag of fluid supplied along the optical waveguide unit and/or the reel.

Further advantageous embodiments of the invention are described in the dependent claims.

BRIEF DESCRIPTION OF THE DRAWINGS

The invention will now be described in more detail on the basis of exemplary embodiments shown in the accompanying drawing, of which.

In the present application, equal or similar parts have equal or similar reference signs.

DETAILED DESCRIPTION OF THE DRAWINGS

Figure 1:
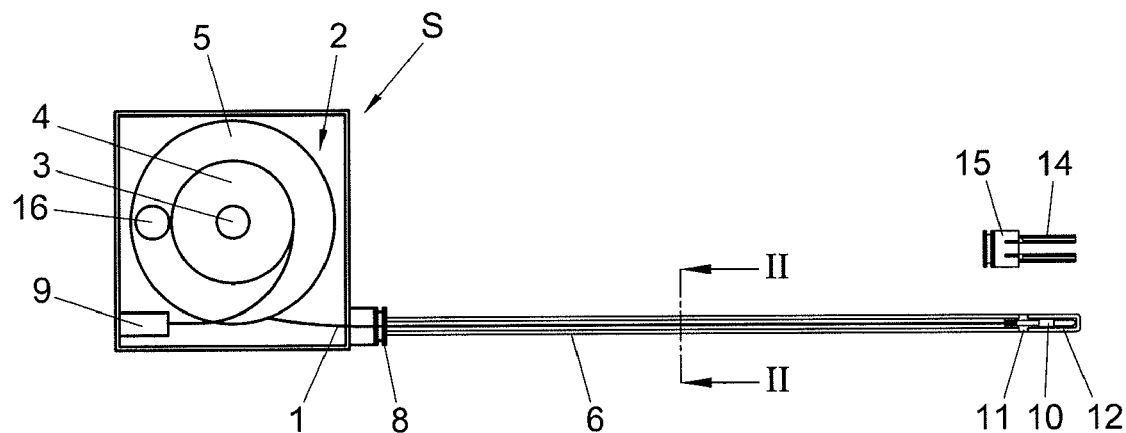
FIG. 1 schematically depicts a partly opened side view of an embodiment of the invention.
Figure 2:
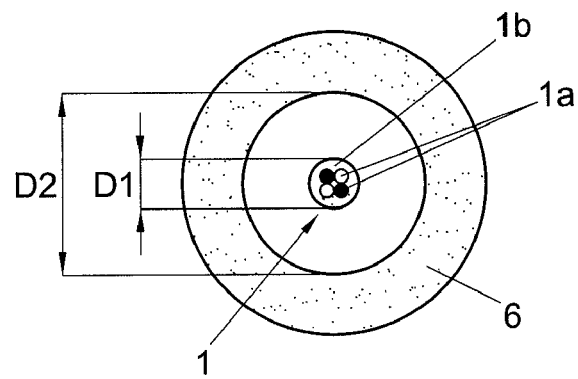
FIG. 2 is a cross-section over line II-II of FIG. 1.

FIGS. 1-3 show an example of an optical waveguide assembly. The assembly includes a storage device S having a housing (for example a box) 7 and a rotatable reel (spool) 2. The reel 2 is rotatable about an axis 3, and the reel 2 includes a core 4 having flanges 5.

Also, the illustratively depicted assembly includes a single flexible optical fiber unit 1, having a small external diameter D1 of at most 2 mm. According to an exemplary embodiment said external diameter D1 is 1 mm or smaller. In an illustrative embodiment, the external diameter D1 of the unit 1, in this case a "buffered" fiber or bundle of fibers, is 0.9 mm. The optical fiber unit 1 is bare, that is, the unit 1 does not include a cable sheath (and therefore is not part of a fiber optic cable). The diameter of the bare fiber unit 1 is, for example, 0.25 mm.

Figure 3A:
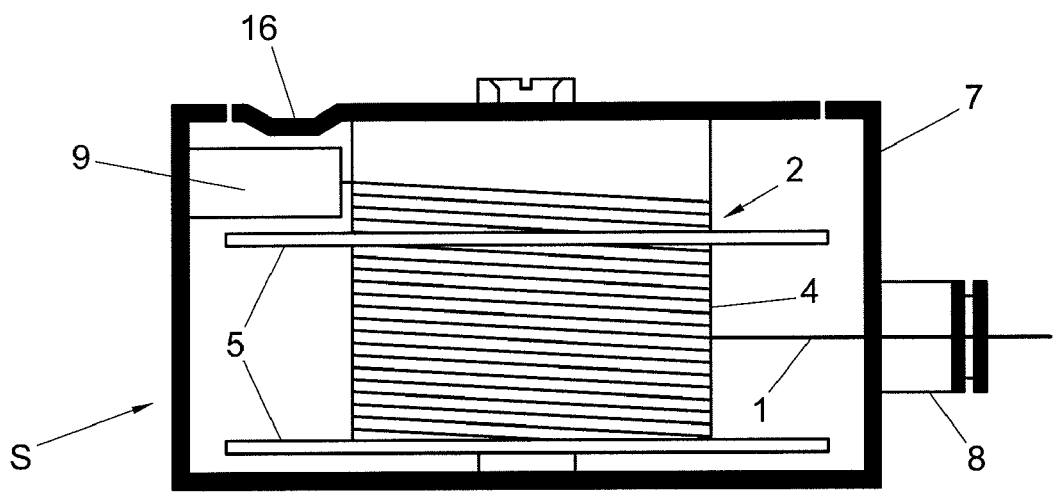
FIG. 3A schematically depicts a partly opened bottom view of a storage device part of the embodiment shown in FIG. 1.
Figure 3B:
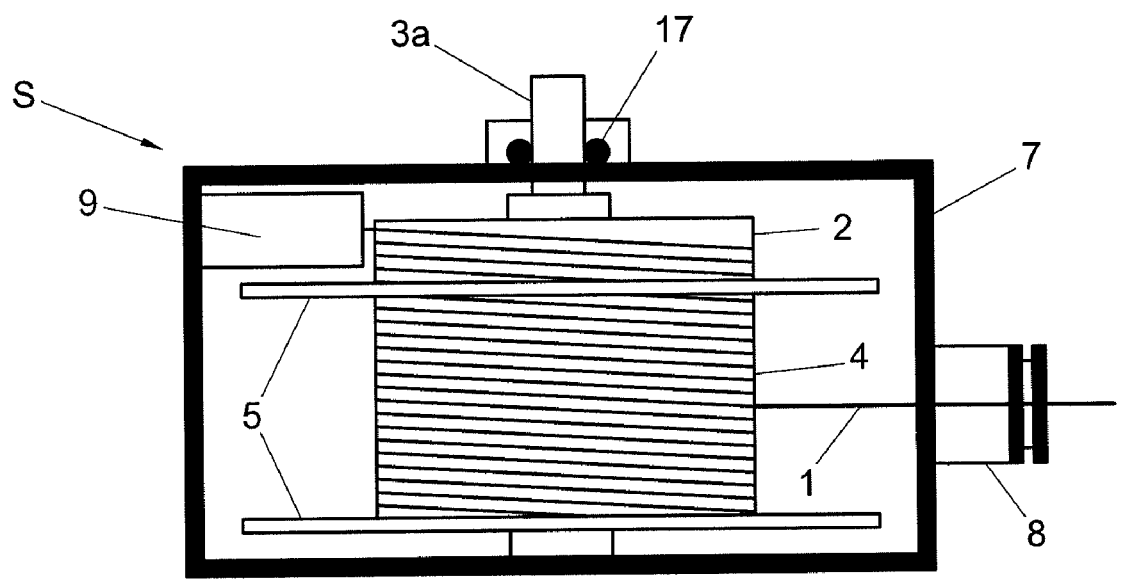
FIG. 3B is a similar view as FIG. 3A, showing an alternative embodiment.
Figure 3C:
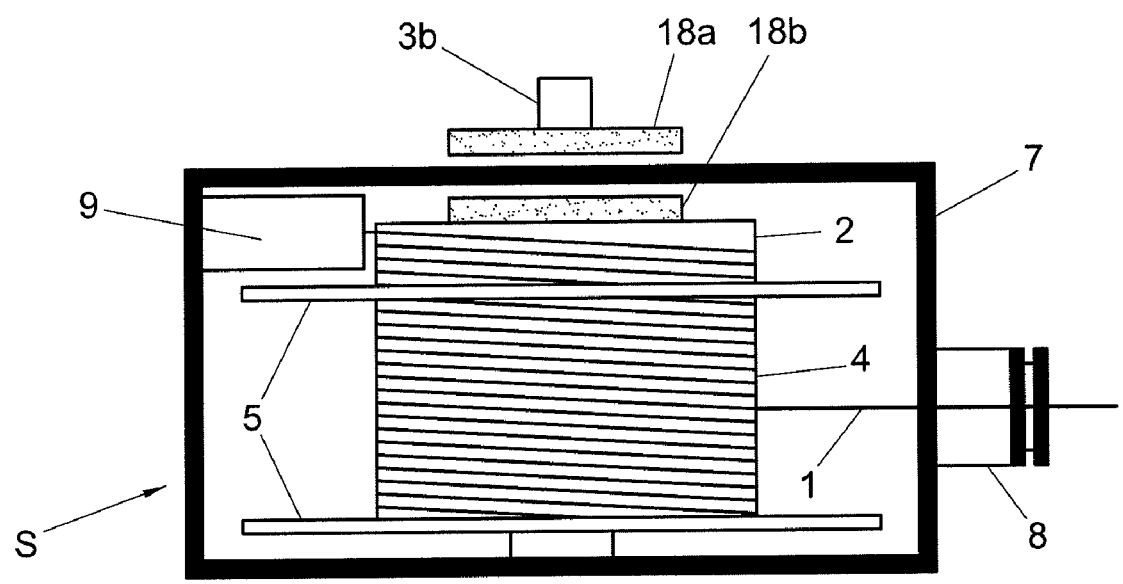
FIG. 3C is a similar view as FIG. 3B, showing another alternative embodiment.
Figure 4:
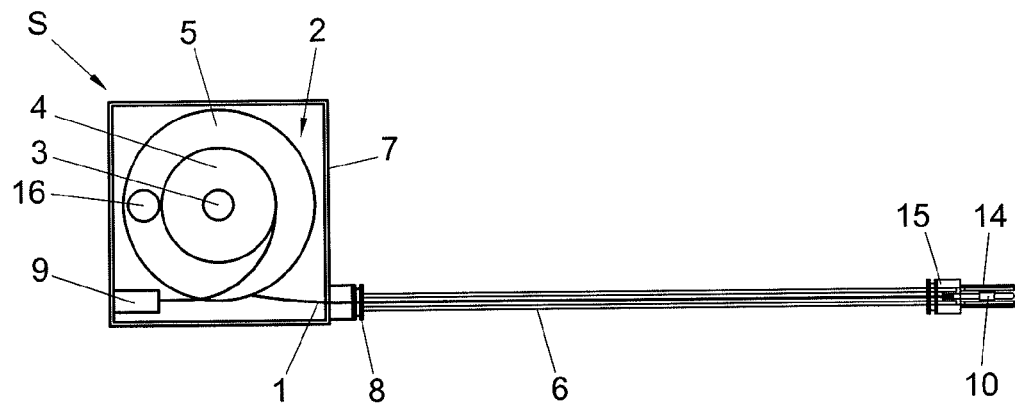
FIG. 4 shows an embodiment wherein a distal end of the fiber unit has been provided with a connector.
Figure 5A:
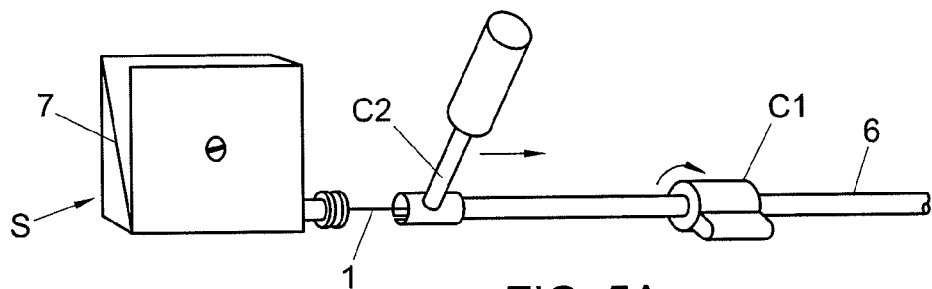
FIG. 5A schematically shows a method for removing a duct part.
Figure 5B:
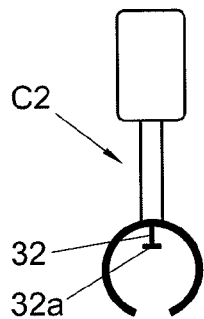
FIG. 5B shows a front view of an example of a longitudinal cutter.
Figure 5C:
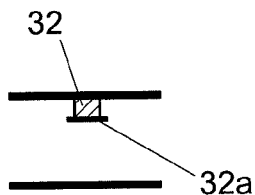
FIG. 5C shows a longitudinal cross-section of the longitudinal cutter.
Figure 5D:
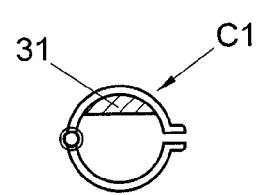
FIG. 5D shows a front view of a radial cutter.

The reel is coupled to the fiber unit 1 for winding and/or unwinding the unit 1. In FIGS. 3A, 3B, 3C, the fiber unit 1 is partly wound onto the reel core 4 (between the flanges 5). Coupling of the optical fiber unit 1 (and particularly part of an inner loop of optical fiber unit 1) to the reel 2 is achieved in various ways, for example by a clamp, lock, by adhesive, and/or in a different way. For example, the reel 2 (for example a flange 5 or core 4 thereof) includes a fiber unit holding bore or slit, for receiving and holding the fiber unit 1. Preferably, the fiber unit 1 is detachably connected to the reel 2, so that the fiber unit 1 is replaced with a new fiber unit.

Besides, the assembly includes an external elongated protective enclosure 6, the enclosure 6 receiving at least part of the optical fiber unit 1 that is coupled to the reel 2. A cross-section of the elongated enclosure 6 and fiber unit 1 is shown in FIG. 2.

The flexible fiber unit 1 as such is configured in various ways. In the present embodiment, the optical fiber unit 1 is a fiber bundle, including several optical fibers (providing respective optical waveguides, for transmitting optical signals), extending in parallel, and an outer protective coating 1b (for example a plastic coating or UV-matrix 1b) surrounding the fibers 1a, and holding the fibers 1a together. In the illustrative embodiment, the outer surface of the protective coating 1b determines the small external diameter D1 of the unit 1. Generally, each of the fibers 1a as such can include a fiber core, a respective cladding, and one or more optional coatings.

Alternatively, an optical fiber unit 1 can include a single fiber having a respective external protective fiber coating that determines said small external diameter of the unit.

Preferably, "bend-insensitive" fibers 1a are applied, which may buckle (for example due to thermal fluctuations) with relatively little or no optical attenuation.

In the following, the elongated enclosure 6 will be referred to as a microduct 6. The microduct 6 encloses an internal fiber unit receiving space, having a diameter D2 that is larger than the external diameter of the optical fiber unit. For example, a ratio of the diameters D1:D2 is in the range of about 1:1.5-1:10, particularly 1:2-1:5, more particularly 1:2-1:3.

For example, the microduct 6 is a hollow tube or duct, for example made of plastic (for example High Density Polyethylene, HDPE), configured for loosely receiving the fiber unit 1. Preferably, the external surface of the fiber unit 1 is not attached to the internal surface of the microduct 6, such that the unit 1 is moved in longitudinal directions through the microduct. In the present example, the external microduct 6 has a circular cross-section. The microduct's cross-section can also have a different shape such as, for example, oval, rectangular, hexagonal, or almost any other shape.

According to an embodiment, the fiber unit receiving space of the microduct 6 contains air (besides the fiber unit 1). In use, the microduct 6 is connected to part of a building, for example a wall. One preferred installation method involves stapling the microduct 6 to a building part. Similarly, the local storage device S is connected to part of a building, using stapling, and/or any other suitable way including, for example, clamping, bolting, screwing, or the-like. According to a further embodiment, the reel axis 3 includes a bore for receiving an attachment means (for example screw or bolt) to connect the device S to a support (for example a wall). The microduct 6 is preferably flexible or bendable, allowing ease of installation. The microduct is preferably constructed such that its bending radius is limited. By way of example, a radial and longitudinal freedom of the fiber unit 1 with respect to the microduct 6 is available, to make the unit 1 relatively resistant to rough installation practices (such as uncontrolled stapling).

In the present embodiment, the microduct 6 and reel housing 7 are associated with one another and are called an optical fiber unit storage system 6, 7. In the present example, a single optical fiber unit 1 is located in the storage system 6, 7. Alternatively, the system 6, 7 is configured to hold a plurality of optical fiber units 1.

As follows from the drawings, the reel housing 7 comprises an optical fiber unit outlet 8 for guiding the fiber unit 1 from the housing 7 to an environment thereof (for example into the microduct/enclosure 6). A proximal end of the elongated protective microduct 6 is connected or connectable to the outlet 8 to receive the fiber unit 1. For example, the outlet 8 is configured to firmly hold the microduct 6's proximal end, by clamping, locking, snapping, using magnetic force, an adhesive substance, or in a different manner. In an embodiment, the outlet 8 and external microduct 6 are configured to cooperate, to hold the parts 6, 8 together.

In FIGS. 1-3, part of the optical fiber unit 1 extends from the reel housing, through the elongated protective microduct 6, to a distal end of the microduct 6. By way of example, the distal end of the optical fiber unit is coupled, (for example detachably) to the distal end of the protective microduct 6.

In the illustrative embodiment, the distal end of the fiber unit 1 is partly pre-connectorized, for example, by integrally comprising a fiber optic ferrule 10 to be used in a fiber optic connector 14.

Preferably, the connector part of fiber unit's distal end is configured not to be pulled inwards into the microduct 6. To this aim, the present embodiment includes a ferrule positioning means 11, configured to hold the ferrule 10 at the end of the microduct 6.

Particularly, in the example, the ferrule 10 of the fiber unit 1 includes a spacer 11 (for example a removable spacer 11, without the need to remove the ferrule 10) dimensioned to abut against the top of the microduct 6 to block inward movement of the ferrule during installation. Also, an optional removable ferrule cap 12 protects the ferrule 10 during installation. In a further embodiment, external cross-sectional dimensions of the ferrule 10, the optional spacer 11 and optional cap 12 do not exceed the external dimensions of the microduct 6 (as in FIG. 1). In this embodiment, a diameter of the ferrule 10 is smaller than the inner diameter D2 of the microduct 6.

During installation the assembly of the fiber unit 1 and respective microduct 6 is pulled through small holes, for example in walls or ceilings of a building, providing a plug & play do-it-yourself solution. Damage to the ferrule and internal fiber unit 1 is prevented by the cap 12 which encloses the ferrule.

Also, in the illustrative example a connector housing 14 is provided that is configured to receive the fiber unit's ferrule 10 after removal of the ferrule cap 12 (if any). A body 15 of the connector housing 14 is configured to be attached to the distal end of the microduct 6, for example removably, by a snapping action, by clicking, adhesive, under mechanical force or magnetic force, and/or in a different manner. As follows from the drawings, the connector housing 14 can have external dimensions (when viewed in cross-section) that exceed the external dimensions of the microduct 6. Optionally, the distal end of the microduct 6 includes a coupling structure, for example clamping means, gripping means or magnetic means, for cooperation with the connector body 15, to (detachably) hold the connector housing 14.

Figure 6:
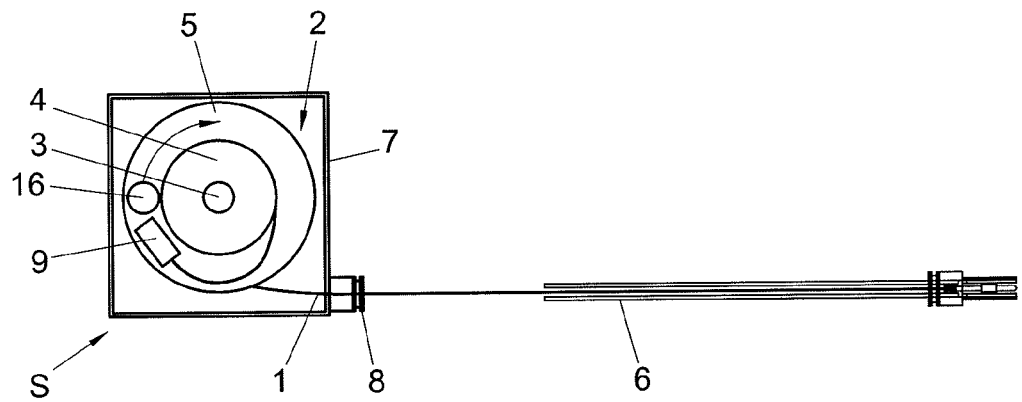
FIG. 6 shows the embodiment of FIG. 4 after removal of part of the fiber duct.

Referring to FIG. 1, a remaining part of the optical fiber unit 1, located in the reel housing 7, may be looped at least once around the reel 2 (and coupled to the reel 2, for example in an above-described manner) and extends to a proximal part of the fiber unit 1. The proximal fiber unit part is integrally provided with a proximal connector 9, for example a male or female fiber optic connector 9, and includes a respective integral fiber connector ferrule. In the example, the proximal connector 9 is associated with the storage device S. The connector 9 is configured to be rotated together with the reel 2 (see, FIG. 6). Besides, the connector 9 may be detachably connectable to part of the storage device S (for example in the housing 7, or external to the housing 7). For example, the reel 2, the housing 7, or both, are configured to detachably hold the proximal fiber optic connector 9. Also, rotation of the reel 2 is blocked in case the proximal connector 9 is connected to the housing 7 (connector position 9a in FIGS. 7-8). To this aim, the storage device S includes a reel blocking device to lock reel rotation. The reel blocking device is configured in various ways, and is not depicted in the present drawings.

The reel 2 may be manually rotatable. For example the reel 2 can include a manually operated member, for example a small pot-hole 16, to set the reel in motion. Alternatively, or in addition, a dedicated reel driver is provided, for example, in case the housing 7 is hermetically sealed from an environment.

FIG. 3B shows a first example of a reel drive, wherein a reel axis 3a reaches out of the housing 7, for example via a sealing passage (that may for example include a resilient O-ring 17 for sealing any slit between the passage and the axis 3a). The reel drive axis 3a may be manually driven, or configured to be driving using a machine, for example a drill and/or screw driven apparatus.

FIG. 3C shows an alternative embodiment wherein the reel axis 3b does not reach out of the housing, but is instead coupled magnetically to an external drive, for example a drill and/or screw driver machine, by magnetic elements 18a and 18b. This also makes it possible to limit the torque on the reel 2.

In yet a further embodiment, rotation of the reel 2 is achieved utilizing a fluid flow. For example, a fluid (preferably air) is fed through the microduct 6 such that the fluid drags along the fiber unit 1 into a desired direction (for example a direction X away from the storage device S). In another example, fluid (for example air) is fed through the housing 7 of the storage device S, wherein the reel 2 is configured to be set in motion by the fluid flow.

Also, optionally, the storage device S can include an anti-buckling control to prevent or reduce bucking of the fiber unit 1, for example an anti-buckling system as described in EP1015928. Instead of anti-buckle control it is also possible to avoid buckling of the fiber unit 1 by proper guiding of the latter.

An outer contour of the core 4 of the reel 2 provides a fiber unit receiving surface that contacts the protective coating 1b of the most inner loops of the fiber unit 1 when wound on the reel 2. Subsequent (more outer) loops of the fiber unit 1 that are wound on the reel contact previous (inner) loops. Since the outer diameter D1 of the fiber unit 1 is very small, a relatively small reel 2 can hold a relatively long fiber unit part in a surprisingly compact manner. Thus, also, a relatively compact version of the storage device housing 7 is feasible.

By way of example, an external diameter of the reel 2 is relatively small, for example about 5 cm or smaller. Also, an axial width of a fiber unit receiving section of the reel 2 (extending between the flanges 5) is about 3 cm, or smaller. An embodiment of the reel of the assembly is configured to hold at most 1000 m of the optical fiber unit, particularly at most 100 m. In a further embodiment, the reel 2 is configured to hold at most 50 m of optical fiber unit 1 length. In an exemplary embodiment, the flanges 5 of reel 2 each have a diameter of 5 cm, or smaller. The width of the reel 2 between the flanges 5 is 2 cm, or smaller. In an embodiment, a reel 2 having a 5 cm flange diameter and 2 cm width between the flanges holds more than 30 m of the fiber unit 1.

Besides, the assembly can include a plurality of optical waveguide units, each of the units being coupled to the reel to be wound and/or unwound.

Also, according to an embodiment, a maximum length of a respective microduct 6 of the assembly is 1000, particularly 100 m, for example 50 m. In yet a further embodiment, each microduct 6 can have a modular configuration, wherein the microduct consists of a plurality of microduct parts joined together to form the microduct 6.

Operation of the assembly follows from FIGS. 1, 4-7. Operation can involve a method for installing the fiber optic unit 1, the unit 1 being coupled to the reel 2, wherein part of the unit 1 is arranged in the elongated protective microduct 6 that is external to the reel 2 (see FIGS. 1, 5, 6).

In one example, an empty elongated protective microduct 6 is positioned to receive the optical fiber unit 1 from the reel 2 (by connecting the duct 6 to the optical fiber unit outlet 8 of the housing 7), after which at least part of the optical fiber unit 1 is unwound from the reel, to be arranged in the microduct 6.

Besides, an embodiment can involve positioning an elongated protective microduct 6, already containing optical fiber unit 1, to supply the optical fiber unit 1 to the reel 2, after which at least part of the optical fiber unit 1 is wound on the reel.

Also, as will be explained below (see, FIGS. 5 and 6), the method can include shortening the elongated protective microduct 6 by removing a first part of the microduct from a second part thereof. The shortening of the elongated protective microduct 6 is carried out without having to remove (i.e., cut) a part from the respective optical fiber unit 1 so that re-connectorizing the optical fiber unit 1 is avoided (i.e., both ends of the optical fiber unit 1 can keep respective connector ferules).

Besides, installation can include: lengthening of the microduct 6, for example by replacing a relatively short microduct 6 with a longer one, or by lengthening the duct 6 in a modular manner (i.e., by connecting an extension duct to the microduct 6).

For example, an installation embodiment can include: providing the reel 2 and the external microduct 6, wherein the optical fiber unit 1 is already coupled to the reel 2, and already extends through the external microduct 6, preferably over the full length of the microduct 6, wherein the distal end of the fiber unit 1 includes the spacer 11 and ferule cap 12 (as in FIG. 1). In the case where the external microduct 6 has a desired installation length, the prepared microduct 6 (containing optical fiber unit 1) is positioned along a desired path, for example along part of a building or structure. Also, the storage device S, coupled to the fiber unit 1 and preferably also to the microduct 6 (via outlet 8), is positioned in a suitable manner. Then, the ferule cap 12 (if present) is removed from the distal end of the fiber unit 1, and a remaining connector housing 14 is mounted. In one example, the spacer part 11 is removed from the fiber unit 1 before mounting the connector housing 14 (as in FIG. 4). Alternatively, the spacer part 11 remains at the ferule 10 when providing the ferule 10 with a remaining a connector part. During or after placing the connector housing 14, the connector body 15 is coupled to the distal end of the microduct 6 (see, FIG. 4).

The resulting situation is depicted in FIG. 3. The optical fiber unit 1 is located in the storage device S and microduct 6, and is connectorized at both ends, to connect to fiber optic connectors of other devices (not shown) to transmit optical signals there-between.

FIGS. 5A-5D, and 6 show an example of shortening the external microduct 6. One or more suitable cutters, for example a radial cutter C1 and a longitudinal cutter C2, is applied to remove part of the microduct 6 from the fiber unit 1. The radial cutter C1 can include a knife 31, for cutting radially through the wall of the microduct 6, without penetrating far into the internal space of the microduct (see, FIG. 5D).

The longitudinal cutter C2 includes a respective knife 32 for cutting in a longitudinal direction though the wall of the microduct 6, where the first part of the microduct 6 is pushed through and the last part pulled through, such operations being needed to avoid damaging the fiber unit 1. The longitudinal cutter knife 32 includes a protective edge part 32a to prevent contact between a sharp cutter edge (extending below the protective part, and perpendicularly thereto) and the fiber unit 1.

After a desired part of the microduct 6 has been removed, a resulting gap in the microduct (in this case, between a fresh proximal end 6a of the microduct 6 and storage device S) is closed. The proximal connector 9 of the fiber unit 1 is placed on a flange 5 of the reel 2 (for example to be held thereby). Next, the reel 2 is rotated to wind up the fiber unit 1, for example by using a finger placed in small pot-hole 16, or using above-mentioned drive means. During the winding up, the proximal end 6a of the microduct and the outlet 8 of the storage device S are drawn together. In the present embodiment, a pulling force is transmitted from the fiber unit 1 via the fiber unit 1's distal connector unit 14 to the microduct. The winding up of the fiber unit 1 is achieved with relative ease compared, for example, to placing loops of fiber with torsion.

When the proximal part of the shortened microduct 6 and the storage device S meet, they are coupled (for example snapped) to each other. Then, optionally, proximal fiber unit connector 9 is removed from the reel 2, for example, to be mounted to the housing 7.

Figure 7:
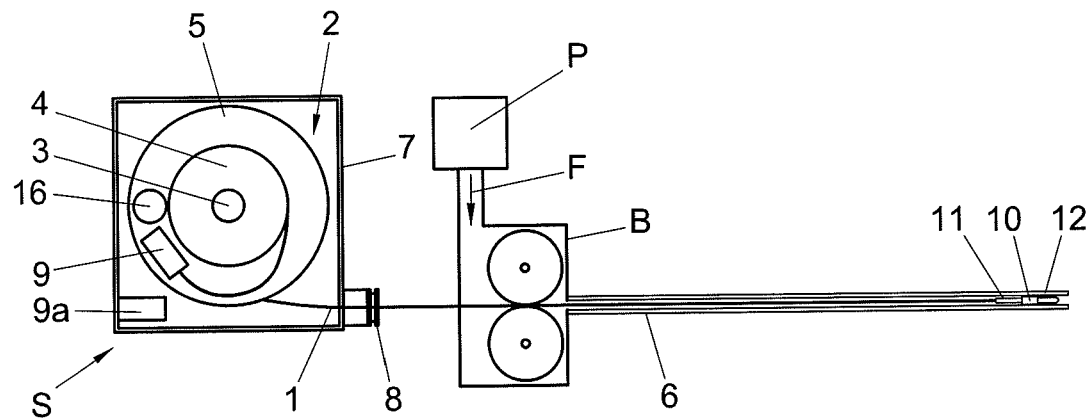
FIG. 7 shows an embodiment wherein the fiber unit is dragged and the reel rotated, by a fluid flow.
Figure 8:
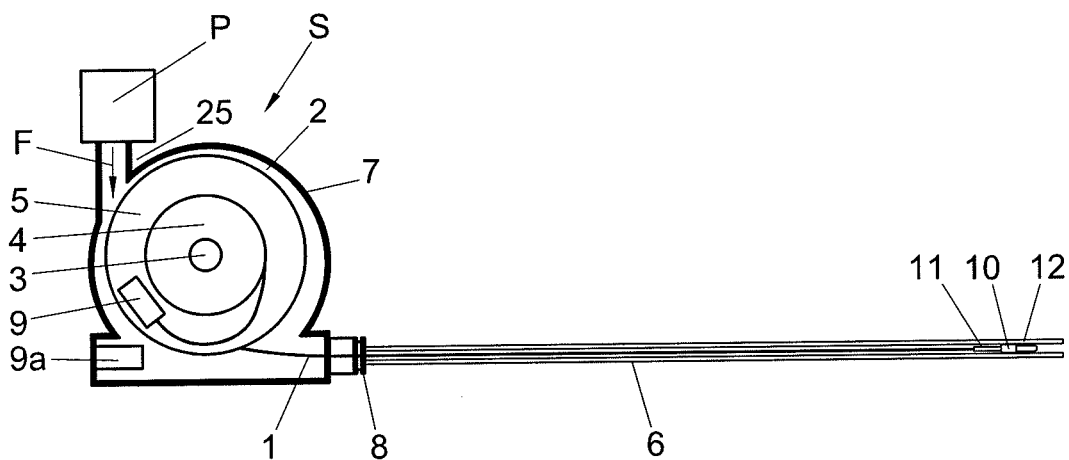
FIG. 8 shows another embodiment wherein the fiber unit is dragged, and the reel rotated, by a fluid flow.

When, after installation, a fiber break occurs, or a newer technology fiber element is desired, the fiber unit 1 is replaced in a straightforward manner. For example, the fiber unit 1 and respective storage device S are both removed from microduct 6. Next, a new storage device S having a new, preferably pre-ferruled, fiber unit 1 is coupled to the microduct 6, after which the fiber unit 1 is unwound, into the microduct 6. This is depicted in FIGS. 7 and 8. In FIGS. 7 and 8, reference sign 9 indicates a first position of the fiber unit proximal connector when the connector is rotatable with the reel 2. Reference sign 9a indicates a second position of the fiber unit proximal connector when the connector is coupled to the reel housing 7.

According to an exemplary embodiment, a fluid flow F is supplied along the optical fiber unit 1 and/or reel, for rotating the reel 2, for example to feed the fiber unit 1 from the reel into the external microduct 6, or to wind up the fiber unit 1 onto the reel.

FIG. 7 shows an exemplary embodiment wherein a fluid flow F is supplied along the optical fiber unit 1 by means of a blowing device B, as described in EP0108590, for example, to feed the fiber unit 1 from the reel into the external microduct 6. To this aim, the blowing equipment B is arranged between the storage device S and the proximal end of the microduct 6. A pump P (e.g. a compressor, a bicycle pump, etc.) is connected to blowing equipment B to supply the fluid flow F. Blowing equipment B is configured to feed the fluid flow F into the microduct 6 to drag the fiber unit 1, thereby unwinding the fiber unit 1 from the reel 2 and propelling the fiber unit 1 through the microduct 6.

FIG. 8 schematically shows another illustrative embodiment wherein an airflow is fed via the reel housing 7 into the microduct 6 (coupled to that housing 7). The reel housing 2 is, for example, a cylindrical housing 7 to better resist the fluid pressure. In this example, a pump P is connected to the assembly S, 6 (via a fluid port 25 of the reel housing 7) that is configured to provide the fluid flow F. During operation, when fluid is fed to the housing 7 the pressure in the reel housing 7 is higher than an exterior (atmospheric) pressure. For example, the reel housing 7 can have a fluid tight configuration except for the fluid port 25 and the fiber outlet 8. In the embodiment, during operation, the microduct 6 is directly connected to the housing outlet 8 for receiving the fiber unit 1 as well as the fluid flow F to drag along the fiber unit 1. Particularly, in FIG. 8, an air flow F is fed to microduct via the reel housing 7, to drag the fiber unit 1 in a direction X away from the reel 2. Because the fiber unit 1 is already inside a pressurized space, there is no need to push the fiber unit into this pressurized space, thus avoiding application of blowing device drive wheels (as shown in FIG. 7).

Alternatively, the fluid port 25 is used to suck or discharge fluid (for example air) from the microduct interior, via the reel housing 7, for example, for rotating the reel 2 to wind up the fiber unit 1.

In FIGS. 7 and 8 the situation is shown where the connector 9 is attached to the reel 2. After installation it is attached to the housing 7, shown as position 9a.

As follows from the above, the disclosure provides a novel assembly that allows a relatively simple and reliable in-house installation of optical wave guides. Embodiments of the invention provide for pulling fiber units through small holes in walls and ceilings. Also, a solution is provided for mismatch of wave guide length with respect to a desired installation length, wherein the excess length is stored in a compact storage device S. Moreover, the system is future proof, wherein cable replacement (of expensive full connectorized fiber optic cables) can be avoided. Replacement of fiber elements installed in a building is achieved without having to rewiring the building and without the need to mount a connector or make a splice.

Although the illustrative embodiments of the present invention have been described in greater detail with reference to the accompanying drawings, it will be understood that the invention is not limited to those embodiments. Various changes or modifications may be effected by one skilled in the art without departing from the scope or the spirit of the invention as defined in the claims.

It is to be understood that in the present application, the term "comprising" does not exclude other elements or steps. Also, each of the terms "a" and "an" does not exclude a plurality. Any reference sign(s) in the claims shall not be construed as limiting the scope of the claims.

What is claimed is:

1. Optical waveguide assembly comprising a storage device, the storage device having a housing and a rotatable reel, the storage device being configured for storing a flexible optical waveguide, and
   wherein the reel is coupled to an optical waveguide unit having an external diameter of at most 2 mm for winding and/or unwinding the optical waveguide unit,
   wherein the housing is associated with an external elongated protective enclosure, the enclosure being configured to receive at least part of the optical waveguide unit,
   wherein at least part of the optical waveguide unit extends through the external elongated protective enclosure to a distal end thereof, and
   wherein a distal end of the optical waveguide unit is configured to be coupled to the distal end of the external elongated protective enclosure, the coupled arrangement between the distal end of the optical waveguide unit and the distal end of the external elongated protective enclosure establishing a stop for preventing further movement of the distal end of the optical waveguide unit into the external elongated protective enclosure.

2. The assembly according to claim 1 wherein the optical waveguide unit includes at least one optical fiber having a protective coating, and wherein the reel has a fiber unit receiving surface that contacts the protective coating of inner loops of the waveguide unit when the waveguide unit is wound on the reel.

3. The assembly according to claim 1, wherein a first end of the optical waveguide unit comprises a first optical fiber connector part, wherein the first connector part and the reel are jointly rotatable.

4. The assembly according to claim 1, wherein the housing comprises an optical waveguide unit outlet, and wherein a proximal end of the external elongated protective enclosure is connected or connectable to the outlet.

5. The assembly according to claim 1, wherein the external elongated protective enclosure encloses an internal fiber unit receiving space having a diameter that is larger than the external diameter of the optical waveguide unit.

6. The assembly according to claim 1, configured for rotating the reel utilizing fluid drag of a fluid flow.

7. The assembly according to claim 6, wherein the housing has a fluid tight configuration and includes a fluid port to feed fluid to the external elongated protective enclosure via the housing, and/or to discharge fluid from the external elongated protective enclosure via the housing.

8. A method for installing at least one optical waveguide stored by winding on a reel within a housing, the method comprising:
   providing a bare optical waveguide unit having an external diameter of at most 2 mm;
   associating the optical waveguide unit with a reel such that the reel is coupled to the optical waveguide unit for winding and/or unwinding the optical waveguide unit; and
   arranging part of the optical waveguide unit in a coupled arrangement with an elongated protective enclosure that is external to the reel, and wherein the housing is associated with the elongated protective enclosure, the elongated protective enclosure being configured to receive at least part of the optical waveguide unit,
   wherein at least part of the optical waveguide unit extends through the elongated protective enclosure to a distal end thereof, and
   wherein, after the arranging, a distal end of the optical waveguide achieves a coupled configuration with the distal end of the elongated protective enclosure, the coupled configuration establishing a stop for preventing further movement of the distal end of the optical waveguide unit into the external elongated protective enclosure.

9. The method according to claim 8, wherein the elongated protective enclosure is positioned to receive the optical waveguide unit from the reel, after which at least part of the optical waveguide unit is unwound from the reel, to be arranged in the enclosure.

10. The method according to claim 8, further including: shortening the elongated protective enclosure by removing part of the enclosure from a remaining part thereof.

11. The method according to claim 8, wherein a fluid flow is supplied along the optical waveguide unit and/or reel for rotating the reel.

12. The assembly according to claim 3 wherein a second end of the optical waveguide unit comprises a second optical fiber connector part.

13. The assembly of claim 1, wherein the storage device is configured to be coupled to the external elongated protective enclosure configured for receiving at least part of the optical waveguide unit.

14. The method of claim 8, wherein the housing has a maximum dimension of 5 cm for holding the optical waveguide unit having a length of at least 10 m.

15. The assembly according to claim 1 wherein a fiber optic connector effects coupling the distal end of the optical waveguide unit and the distal end of the external elongated protective enclosure.

16. The assembly according to claim 1 wherein a spacer effects coupling the distal end of the optical waveguide unit and the distal end of the external elongated protective enclosure.

17. The assembly according to claim 1 wherein the coupled arrangement between the distal end of the optical waveguide unit and the distal end of the external elongated protective enclosure is effected by attachment according to one or more of the group consisting of:
   snapping action,
   clicking,
   adhesion, and
   magnetic attraction.

18. The method according to claim 8 wherein a fiber optic connector effects coupling the distal end of the optical waveguide unit and the distal end of the external elongated protective enclosure.

19. The method according to claim 8 wherein a spacer effects coupling the distal end of the optical waveguide unit and the distal end of the external elongated protective enclosure.

20. The method according to claim 8 wherein the coupled arrangement between the distal end of the optical waveguide unit and the distal end of the external elongated protective enclosure is effected by attachment according to one or more of the group consisting of:
- snapping action,
- clicking,
- adhesion, and
- magnetic attraction.

\* \* \* \* \*